Oct. 1, 1946.  A. A. GRADISAR  2,408,512
DEVICE FOR FORMING SLITS
Filed Dec. 30, 1942
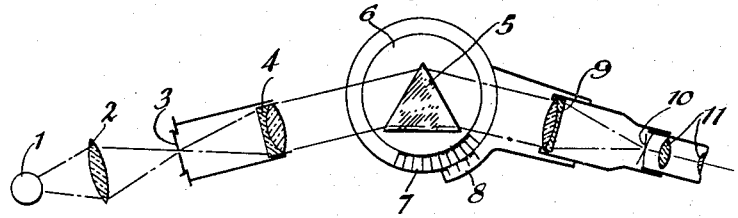
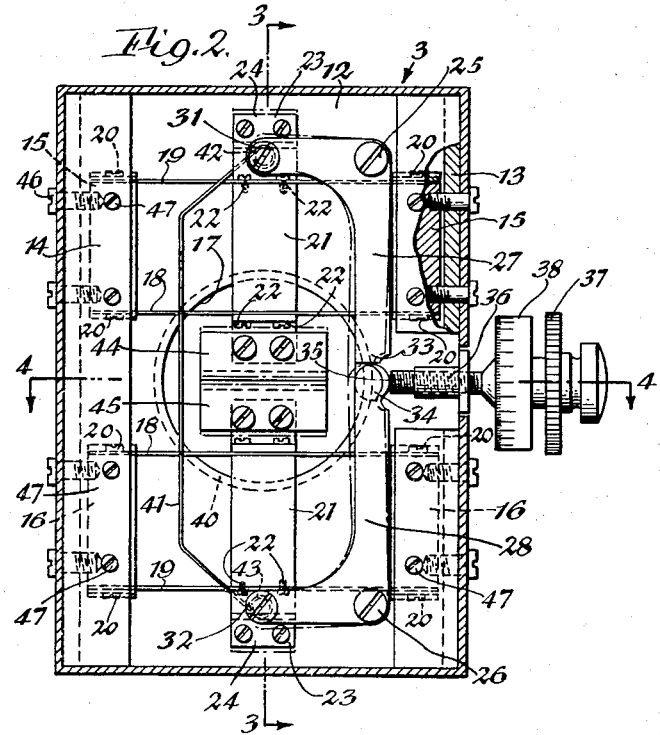
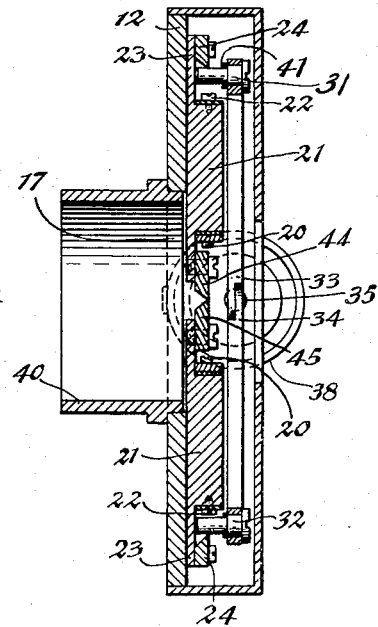
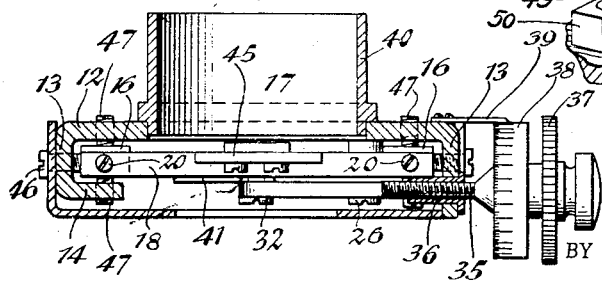
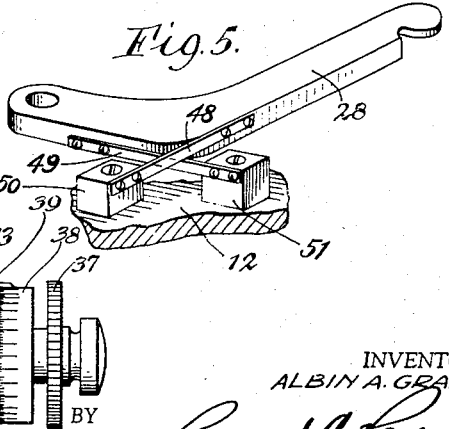
INVENTOR.
ALBIN A. GRADISAR
BY Raymond A. Paquin
ATTORNEY Patented Oct. 1, 1946

2,408,512

UNITED STATES PATENT OFFICE 2,408,512

DEVICE FOR FORMING SLITS

Albin A. Gradisar, Buffalo, N. Y., assignor, by mesne assignments, to American Optical Company, Southbridge, Mass., a voluntary association Application December 30, 1942, Serial No. 470,563

10 Claims. (Cl. 88—61)

This invention relates to optical instruments and more particularly to a new and improved slit mechanism for use in optical instruments such as the spectrometer and spectrograph.

An object of the invention is to provide a new and improved slit mechanism for optical instruments which is relatively simple in construction, efficient in operation and economical to manufacture.

Another object of the invention is to provide a slit mechanism for optical instruments which slit mechanism has an extremely sensitive opening and closing action.

Another object of the invention is to provide a slit of the type set forth the jaws of which may be easily and quickly adjusted.

Another object of the invention is to provide a slit mechanism of the type set forth in which there is no friction loss in the operation of the mechanism and which produces increased accuracy while utilizing a relatively simple and economical construction.

Another object of the invention is to provide a device of the type set forth in which there is no likelihood of any looseness and play or backlash in the blade alignment.

Other objects and advantages of the invention will be apparent from the following description taken in connection with the accompanying drawing and it will be understood that many changes may be made in the details of construction and arrangement of parts without departing from the spirit of the invention as expressed in the accompanying claims. I therefore do not wish to be limited to the exact details of construction and arrangement of parts shown and described as the preferred form has been shown by way of illustration only.

Referring to the drawing:

Fig. 1 is a diagrammatic view of a spectrometer or spectroscope embodying the invention.

Fig. 2 is a front view of the slit mechanism.

Fig. 3 is a sectional view taken on line 3—3 of Fig. 2 looking in the direction of the arrows.

Fig. 4 is a sectional view taken on line 4—4 of Fig. 2 looking in the direction of the arrows; and Fig. 5 is a perspective view of another form of hinge connection.

Referring more particularly to the drawing wherein similar reference characters designate corresponding parts throughout the several views, the spectroscope or spectrometer which is shown diagrammatically in Fig. 1 and which is of a relatively simple type shown for the purpose of illustrating an application of the present invention comprises a light source 1, condensing lens 2, slit mechanism 3 and collimating lens 4. Aligned therewith is the prism 5 on the support 6 which support has adjacent its periphery the circular fixed scale 7. Associated with said prism support 6 is a support having a vernier 8 adapted to be moved relative to said fixed scale 7. Also aligned with said prism 5 is the objective lens system 9, reticules or crosshairs 10 and eyepiece lenses 11.

It will be seen from the above construction that the image seen in the eyepiece of the instrument may be controlled by adjustment of the adjustable slit mechanism 3 which is positioned between the source of light 1 and the prism 5 and through which light from the light source 1 passes to said prism 5.

As shown the condensing lens 2 focuses light from the source 1 on the slit 3. The slit then acts as a narrow brilliant aperture from which the rays proceed to fill the collimating lens 4 which renders said rays parallel for passage through the prism 5. The refracted rays are then focused by the objective lens 9 in the plane of the crosshairs 10 and by moving the telescope arm a ray of desired wavelength is brought to the crosshairs 10 and the slit image or spectral light is examined through the eyepiece lens 11. The size of the image observed is a function of the size of the slit and the magnification of the optical system.

The slit mechanism as shown in detail in Figs. 2, 3 and 4 comprises a base member 12 having formed integral therewith the side portions 13 and flange portions 14.

Secured to said side portions 13 are the supporting blocks 15 and 16 one pair on either side of the opening 17 in said base member 12. These blocks 15 and 16 are preferably all of the same size and are secured to said base 12 and the side portions 13 symmetrically by the screws 46. The blocks 15 and 16 are adjustable by adjusting the set screws 47 one of which extends through the wall 12 and the other through the wall 14 so that each of said blocks 15 and 16 is positioned between two pairs of these screws 47 which allows adjustment thereof and the block is further retained in position by the screws 46.

The operation or adjustment of the screws 47 serves to position the knife edges of the two slit jaws 44 and 45 in the same plane, while the screws 46 serve to adjust the said knife edges of the two slit jaws 44 and 45 parallel to each other.

Screws 46 further serve to adjust the tension in the resilient reed members 18 and 19 by adjusting the distance between the blocks 15 or 16 to which the ends of said reed members are attached.

A pair of thin resilient reed members 18 and 19 are provided for each pair of said blocks or supporting members 15 and 16 respectively. These reed members are secured adjacent their opposed ends to each of opposite ends of said supports 15 and 16 respectively by screws or the like 20.

Each pair of said reed members 18 and 19 is secured adjacent its center to a floating jaw support member 21 by means of the screws or the like 22 and said support members 21 have the reduced extension portions 23 having block members 24 secured thereto by screws or the like adjacent the outer ends of said reduced portions 23 and leaving a space between the block members 24 and the inner ends of said reduced portions.

The base 12 is provided with bearings for each of the pivot pins 25 and 26. Pivotally mounted by the pivot pins 25 and 26 are the lever arms 27 and 28 respectively.

The said lever arms 27 and 28 serve as bell cranks to transmit motion from the calibrated screw to the slit jaws 44 and 45 through the block members 24 and members 21. The said lever arms 27 and 28 are provided with the pins 31 and 32 respectively which are secured to said lever arms and engage the knife edge of the block 24. This arrangement utilizing the pins in engagement with the knife edges to move the floating jaw supports 21 applies the motivating force along the center of the system so that the opposing force of the reed members will cause neither rotation nor displacement of the slit jaws during adjustment of the slit.

The end portions 33 and 34 of said lever members 27 and 28 opposite said pins 31 and 32 are preferably in interlocking relation and are adapted to engage the end of the screw 35 which is threaded through the support 36 on the base 12 and which screw 35 is provided with the knurled head 37 for rotating the same. The said screw is also provided with the scale arrangement 38 which is adapted to be read in conjunction with the indicating member 39.

Rotation of the screw 35 and consequent adjustment of the arms 27 and 28 causes adjustment of the slit jaws as described above.

It will be noted that the movable or floating slit jaw supports 21 are floating on the resilient reed members 18 and 19 and are never in contact with any other surface so that the motion of these members is never impaired by sliding friction losses. This results in a slit that is extremely sensitive to adjustment and whose hysteresis losses are reduced to a minimum. By hysteresis losses is meant a lagging or retardation of movement when the direction of the movement of the members is changed.

It will also be noted that as the slits and slit supports are secured to the center of a resilient reed member which reed member is anchored at its ends and under tension, that the slit jaws are retained in any position of adjustment under tension and therefore the possibility of misalignment is eliminated.

Secured to the base 12 adjacent the opening 17 is shown the tubular member or mounting flange 40 which may be varied according to the particular type of device with which the slit is to be employed. The resilient or spring member 41 is provided having its ends 42 and 43 engaging the pins 31 and 32 respectively. This spring 41 eliminates the effect of the weight of the bell cranks on the adjustment of the slit jaws.

When it is desired to operate the slit mechanism to open the slit jaws or increase the distance between the said jaws 44 and 45 the screw member 35 is rotated by turning the knurled portion 37 which causes the end of said screw to bear against said interlocking portions 33 and 34 on the pivoted lever arm to pivot said arms 27 and 28 respectively thereby causing the pins 31 and 32 to move said supports 21 in opposite directions and parallel to their normal position to open said jaws 44 and 45 and retain the separation between said jaws uniform throughout the entire length thereof.

The amount of the opening of the jaws can be read on the scale member 38 against the indicator 39. When it is desired to close the slit jaws the screw member 35 is rotated in an opposite direction by turning the knurled portion 37 and due to the resiliency of the reed members 18 and 19 the members 21 travel toward each other in a direction parallel to their normal position to the extent permitted by the adjustment of the screw 35 against the portions 33 and 34.

In Fig. 5 is shown a modified form of pivot arrangement for the lever arm 28. This pivot arrangement comprises the flexible reed members or the like 48 and 49. The member 48 is secured at one end by screws or the like to the side of the arm 28 and at its opposite end is secured by screws or the like to a block 50 which is secured to the support 12. The member 49 is secured at its opposite ends by screws or the like to the end of the lever arm 28 and the block 51. It will be noted that instead of single reed members 48 and 49 that a plurality of such members could be employed.

It is pointed out that due to the reed arrangement and parallelogram construction that the slit jaws 44 and 45 will always move in such a direction that the edges of said jaws are parallel throughout their entire length and also that a smooth frictionless action is provided which provides a low pressure on the closing of the jaws thereby eliminating the possibility of damage to the jaws and also that the device is extremely sensitive and easily aligned and adjusted for parallelism of the plates.

It is also pointed out that with the present construction a construction is provided which provides increased accuracy and which yet is easy to assemble and adjust and relatively economical to manufacture.

From the foregoing it will be seen that I have provided simple, efficient and economical means for obtaining all of the objects and advantages of the invention.

Having described my invention, I claim:

1. A device for forming a slit of precisely adjustable width for admission of a light beam in a spectrometer or like optical system having, in combination, means providing a first slit-defining edge, a jaw member including a jaw providing the second slit-defining edge opposed to said first edge, means mounting said jaw member for adjustment movement in opposite directions normal to said slit toward and away from said first slit-defining edge, said mounting means comprising supports at opposite sides of the path of adjustment of said jaw member and flexible reed means fixed to said member and to said supports and extending transversely of the path of adjustment to float said member between said supports, and adjustment means engaging said jaw member and manipulable in one direction to force said jaw member in one of its said opposite directions of adjustment against the yieldable resistance of said reed means and in the reverse direction to control return movement of said jaw member by the release of tension of said reed means, said reed means being so constructed and arranged as to support said jaw member in a fixed plane, and to be under tension urging said jaw member in one of its said opposite directions of adjustment and into operating contacting engagement with said adjustment means, at all positions of adjustment of said jaw member.

2. A device as claimed in claim 1 wherein said reed means comprises flat, elongate reed members of substantially greater width than thickness arranged edgewise to the plane of adjustment of said jaw member.

3. A device as claimed in claim 1 wherein said reed means includes at least two reed members attached to said jaw member and to said supports at each side thereof, said reed members being spaced longitudinally of the path of adjustment of said jaw member.

4. A device for forming a slit of precisely adjustable width for admission of a light beam in a spectrometer or like optical system having, in combination, means providing a first slit-defining edge, a jaw member including a jaw providing the second slit-defining edge opposed to said first edge, means mounting said jaw member for adjustment movement in opposite directions normal to said slit toward and away from said first slit-defining edge, said mounting means comprising supports at opposite sides of the path of adjustment of said jaw member and flexible reed means fixed to said member and to said supports and extending transversely of the path of adjustment to float said member between said supports, and adjustment means engaging said jaw member and manipulable in one direction to force said jaw member in one of its said opposite directions of adjustment against the yieldable resistance of said reed means and in the reverse direction to control return movement of said jaw member by the release of tension of said reed means, said reed means being so constructed and arranged as to support said jaw member in a fixed plane, and to be under tension urging said jaw member in one of its said opposite directions of adjustment and into operating contacting engagement with said adjustment means, at all positions of adjustment of said jaw member, said adjustment means being so arranged and engaged with said jaw member as to apply pressure thereto only in a direction parallel to the longitudinal center line of said jaw member and substantially at said center line whereby to maintain said jaw member in predetermined alignment with said first slit-defining edge throughout adjustment of said jaw member.

5. A device for forming a slit of precisely adjustable width for admission of a light beam in a spectrometer or like optical system having, in combination, a pair of opposed, slit-defining jaw members each comprising a jaw having a slit-defining edge, means mounting said jaw members for adjustment in parallel directions toward and away from each other, the mounting means for each jaw member comprising supports at opposite sides of the path of adjustment of the jaw member and flexible reed means fixed to said member and to said supports and extending transversely of the path of adjustment to float said member between said supports, and adjustment means comprising an actuator arm for each jaw member pivoted at a point spaced from one side of the member for pivotal movement in a plane parallel to the path of adjustment of said jaw member and positioned to engage a portion of said jaw member on pivoting in a direction away from the slit, and a calibrated adjustment member connected to said actuator arms and manipulable in opposite directions to pivot said arms simultaneously and equally in opposite directions, said reed means being so constructed and arranged as to support each jaw member in a fixed plane, and to be under tension urging said jaw member toward the other jaw member and against its actuating arm, at all positions of adjustment of said jaw member.

6. A device as claimed in claim 5 wherein said portion of each jaw member engaged by its actuator arm is an abutment extending on said member transversely to the path of adjustment and across the longitudinal center line of said member, said abutment being engaged by said actuator arm substantially at said center line.

7. A device as claimed in claim 5 wherein said reed means comprises flat, elongate reed members of substantially greater width than thickness arranged edgewise to the plane of adjustment of said jaw member.

8. A device as claimed in claim 5 wherein said reed means includes at least two reed members attached to the jaw member and to said supports at each side thereof, said reed members being spaced longitudinally of the path of adjustment of the jaw member.

9. A device as claimed in claim 5 wherein said supports for said reed means are mounted for independent adjustment movement toward and away from each other and also in parallel planes substantially normal to the plane of said jaw member.

10. A device for forming a slit of precisely adjustable width for admission of a light beam in a spectrometer or like optical system having, in combination, means providing a first slit-defining edge, a jaw member including a jaw providing the second slit-defining edge opposed to said first edge, means mounting said jaw member for adjustment movement in opposite directions toward and away from said first slit-defining edge, said mounting means comprising supports at opposite sides of the path of adjustment of said jaw member, flexible reed means fixed to said jaw member and to said supports and extending transversely of the path of adjustment to float said jaw member between said supports, means mounting said supports for independent adjustment movement toward and away from each other and also in parallel planes substantially normal to the plane of said jaw member, and adjustment means engaging said jaw member and manipulable in one direction to force said jaw member in one of its said opposite directions of adjustment against the yieldable resistance of said reed means and in the reverse direction to control return movement of said jaw member by the release of tension of said reed means.

ALBIN A. GRADISAR.